(12) United States Patent
Son et al.

(10) Patent No.: US 6,618,599 B1
(45) Date of Patent: Sep. 9, 2003

(54) BASE TRANSCEIVER STATION OF DIGITAL MOBILE TELECOMMUNICATION SYSTEM USING REMOTE INTERFACING UNIT

(75) Inventors: O Sung Son, Ichon-shi (KR); Jang Ho Jeon, Ichon-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/616,216

(22) Filed: Jul. 14, 2000

(30) Foreign Application Priority Data

Jul. 19, 1999 (KR) .......................... 1999-29166

(51) Int. Cl.[7] .............................. H04B 1/38; H04M 1/00
(52) U.S. Cl. ........................ 455/561; 455/522; 375/329
(58) Field of Search ................................ 455/560, 561, 455/422, 423, 446, 449, 522; 370/347, 342; 375/324, 329

(56) References Cited

U.S. PATENT DOCUMENTS 5,555,260 A * 9/1996 Rinnback et al. ........... 370/347
5,809,422 A * 9/1998 Raleigh et al. .............. 455/449

FOREIGN PATENT DOCUMENTS

WO    WO 9627269 A1 * 9/1996  ........... H04Q/7/30
WO    WO 99/09769      8/2000

* cited by examiner

Primary Examiner—Quochien Vuong
(74) Attorney, Agent, or Firm—Merchant & Gould P.C.

(57) ABSTRACT

A base transceiver station of a digital mobile telecommunication system comprising a master base transceiver station device (master BTS device) and a plurality of remote radio frequency units separated from the master BTS device and installed at a remote site therefrom for processing radio frequency signals. The master BTS device and the radio frequency units are interconnected via a remote interfacing unit. Therefore, the base transceiver station can become so much smaller in size and lighter in weight that it can be readily installed in a place effecting the optimum propagation. Furthermore, the remote interfacing unit can remotely control and monitor the status of the remote radio frequency units via a radio frequency cable without using a separate control cable.

6 Claims, 4 Drawing Sheets

BASE TRANSCEIVER STATION OF DIGITAL MOBILE TELECOMMUNICATION SYSTEM USING REMOTE INTERFACING UNIT

BACKGROUND OF THE INVENTION

1. Field of the Invention

The present invention relates in general to base transceiver stations of digital mobile telecommunication systems, and more particularly to a base transceiver station of a digital mobile telecommunication system wherein a radio frequency (RF) unit is separated from the base transceiver station and installed remotely therefrom and a remote interfacing unit is installed between the base transceiver station and the RF unit to remotely control and monitor the status of the RF unit via an RF cable.

2. Description of the Prior Art

Generally, a base transceiver station of a digital mobile telecommunication system functions to transmit and receive data and voice over a radio channel, control a terminal (e.g., a personal communication system (PCS) or digital cellular system (DCS) terminal), monitor the quality of speech of the terminal and interconnect the terminal and a base station controller (referred to hereinafter as BSC). Namely, the base transceiver station is located between a mobile station and a BSC to interface between wired and wireless channels and perform main functions associated with a radio link. For example, the main functions associated with the radio link may be a function of allocating and managing forward link power to code division multiplex access (CDMA) frequency, channel and frame option resources, a function of processing an outgoing call signal, incoming call signal, soft handoff call signal and hard handoff call signal and a function of receiving and managing global positioning system (GPS) timing information and providing system timing information to the mobile station and base transceiver station.

The base transceiver station is further adapted to perform a function of transmitting and receiving radio signals over a pilot channel, synchronization channel, access channel, paging channel and traffic channel, a function of routing traffic and control information to the BSC and error detection/statistical information collection/report functions.

Figure 1:
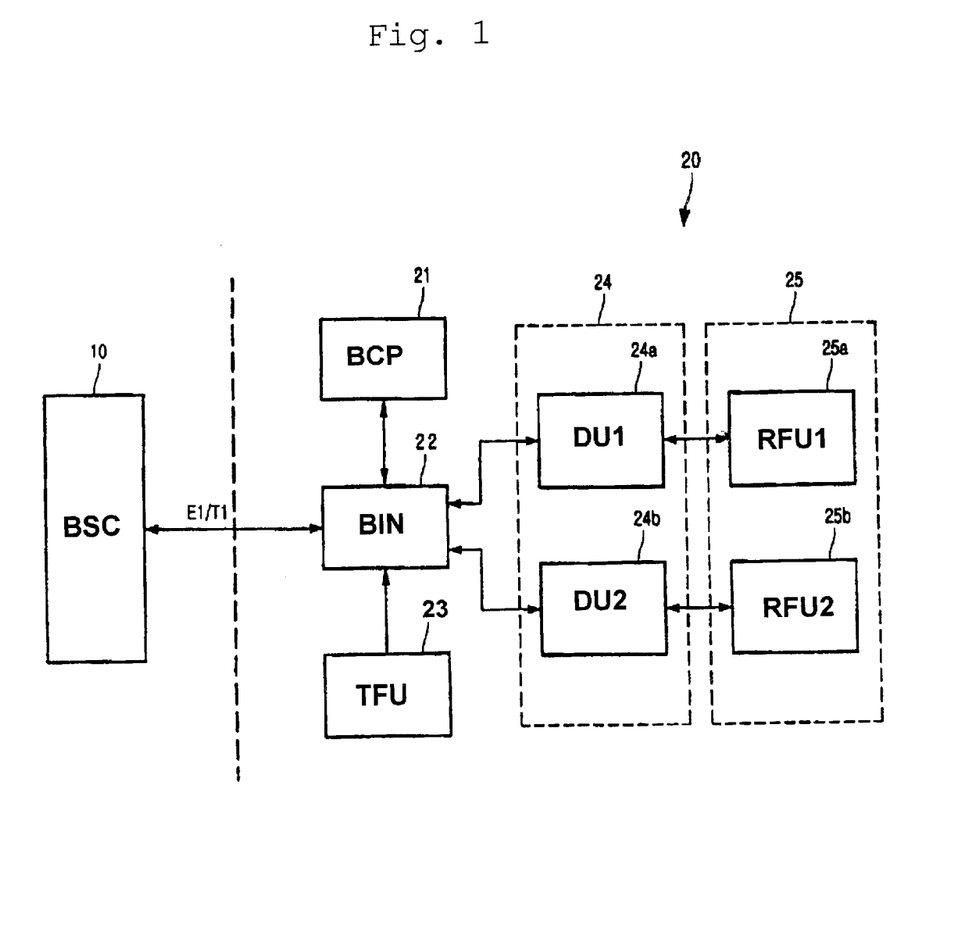
FIG. 1 is a block diagram of a conventional base transceiver station of a digital mobile telecommunication system.

With reference to FIG. 1, there is shown in block form the construction of a conventional base transceiver station of a digital mobile telecommunication system, which is denoted by the reference numeral 20. As shown in this drawing, the base transceiver station 20 comprises a base transceiver station control processor (referred to hereinafter as BCP) 21 for managing and controlling the entire operation of the base transceiver station 20, a base transceiver station interconnection network (referred to hereinafter as BIN) 22 for performing a packet router function between the base transceiver station 20 and a BSC 10 through an E1 line or T1 line and interfacing high-level data link control (HDLC) packet data between processors in the base transceiver station 20, and a time and frequency unit (referred to hereinafter as TFU) 23 for generating a reference frequency and timing synchronization signal to synchronize the processors in the base transceiver station 20 and perform timing synchronization with an adjacent base transceiver station. The base transceiver station 20 further comprises a digital unit (referred to hereinafter as DU) 24 for modulating and demodulating data and voice signals being transmitted and received over a CDMA channel, and an RF unit (referred to hereinafter as RFU) 25 for converting an ultrahigh frequency (UHF) signal from a mobile station into an intermediate frequency (IF) signal, transferring the converted IF signal to the DU 24, converting an IF signal from the DU 24 into a UHF signal, amplifying the converted UHF signal to a predetermined level and radiating the amplified UHF signal over the air.

A description will hereinafter be given of detailed functions of the above-mentioned components of the conventional base transceiver station 20 of the digital mobile telecommunication system.

The BIN 22 provides an interface with the BSC 10 and an internal communication line to the base transceiver station 20 on the basis of the packet routing function.

The BCP 21 controls and diagnoses the entire operation of the base transceiver station 20 and performs an appropriate operation based on the diagnosed result. Further, the BCP 21 acts to download software associated with initialization of the base transceiver station 20.

The DU 24 acts to process voice and data signals being received and transmitted from/to each terminal. In particular, the DU 24 is adapted to process all signals associated with CDMA.

The RFU 25 functions to convert modulated data and voice signals from the DU 24 into RF signals, transmit the converted RF signals to a terminal, demodulate modulated data and voice signals from the terminal, convert the demodulated signals into digital signals and transfer the converted digital signals to the DU 24. The TFU 23 functions to receive information relating to a reference time necessary to the base transceiver station 20 from a GPS and supply the received information to the base transceiver station 20. As a result, all units in the base transceiver station 20 are synchronized with a GPS time and thus have the same timing.

However, the above-mentioned conventional base transceiver station of the digital mobile telecommunication system is disadvantageous in that all components are installed therein, resulting in an increase in the volume of the base transceiver station. Further, a loss on a path to an antenna of the base transceiver station is increased and thus becomes a problem in designing transmission/reception stages. In particular, a small-sized base transceiver station or micro-sized base transceiver station may employ a high power amplifier (HPA) installed in its main hull, leading to an increase in the volume of the base transceiver station. This swims against a recent trend where the base transceiver station gradually becomes smaller in size and lighter in weight.

Furthermore, the use of a number of frequency allocation (FA) frequencies requires a larger number of HPAs in consideration of the capacity of the base transceiver station. Provided that the base transceiver station accommodates all of such HPAs, it will become much larger in volume. This larger volume of the base transceiver station results in a limitation in regard to the place of installation. As a result, the base transceiver station cannot be installed in a place effecting the optimum propagation and thus improve the quality of speech.

SUMMARY OF THE INVENTION

Therefore, the present invention has been made in view of the above problems, and it is an object of the present invention to provide a base transceiver station of a digital mobile telecommunication system wherein a radio frequency unit is separated from the base transceiver station and installed remotely therefrom and a remote interfacing unit is installed between the base transceiver station and the radio frequency unit to remotely control and monitor the status of the radio frequency unit via a radio frequency cable, thereby making the base transceiver station smaller in size and lighter in weight.

In accordance with the present invention, the above and other objects can be accomplished by a provision of a base transceiver station of a digital mobile telecommunication system comprising a master base transceiver station device (master BTS device) and a plurality of remote radio frequency units separated from the master BTS device and installed at a remote site therefrom for processing radio frequency signals, wherein the base transceiver station further comprises remote interfacing means installed between the master BTS device and the remote radio frequency units for a) transmitting control commands to the remote radio frequency units in response to control data from the master BTS device to monitor and control the status of the radio frequency units; b) supplying and monitoring operating power to the remote radio frequency units; and c) receiving status values from the remote radio frequency units and interfacing them to the master BTS device.

Preferably, the remote interfacing means may include a central processing unit; a transmission modem for modulating the control data from the master BTS device in a frequency shift keying manner and transmitting the modulated control data to the radio frequency units; a frequency divider for dividing the frequency of output data from the transmission modem into different frequencies; a plurality of diplexers, each of the diplexers transmitting a corresponding one of output signals from the frequency-divider to one of the radio frequency units associated with a given sector at a transmission frequency and receiving the status value from the corresponding radio frequency unit at a reception frequency; a plurality of reception modems for demodulating output data from the diplexers in the frequency shift keying manner, respectively; and a signaling connection controller for receiving output data from the reception modems and sending the received data to the master BTS device.

More preferably, the master BTS device and the remote interfacing means may perform communication with each other according to an RS-232 communication protocol and an RS-422 electrical interface standard, and the remote interfacing means may transmit the control commands to the remote radio frequency units and receive the status values therefrom via radio frequency modems. Further, the remote interfacing means and the remote radio frequency units may be interconnected via a coaxial cable.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 2:
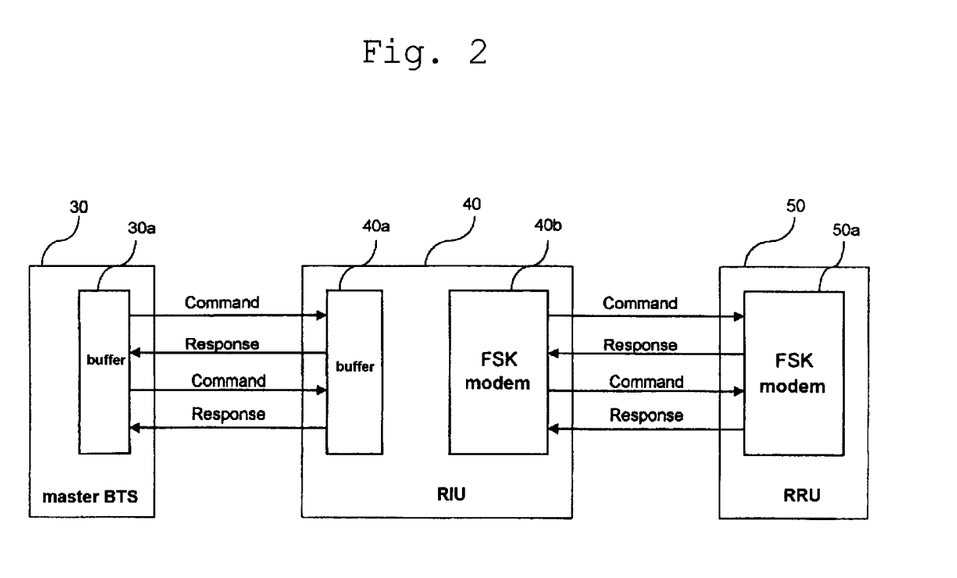
FIG. 2 is a block diagram illustrating an interfacing flow among a master base transceiver station device, remote interfacing unit and radio frequency unit in a base transceiver station of a digital mobile telecommunication system in accordance with the present invention.

FIG. 2 is a block diagram illustrating an interfacing flow among a master base transceiver station device, remote interfacing unit and radio frequency unit in a base transceiver station of a digital mobile telecommunication system in accordance with the present invention. As shown in this drawing, the base transceiver station comprises a master base transceiver station device (referred to hereinafter as a master BTS device) 30, a remote radio frequency unit (referred to hereinafter as RRU) 50 separated from the master BTS device 30 and installed remotely therefrom, and a remote interfacing unit (referred to hereinafter as RIU) 40 installed between the master BTS device 30 and the RRU 50 for interconnecting them. In the present embodiment, the master BTS device 30 and the RIU 40 perform communication with each other according to an RS-232 communication protocol and an RS-422 electrical interface standard. Buffers 30a and 40a are provided respectively in the master BTS device 30 and RIU 40 to control data flows thereof. The RIU 40 communicates with the RRU 50 via RF frequency shift keying (FSK) modems 40b and 50a on the basis of information acquired from the master BTS device 30. As a result, the RRU 50 controls its operation under control of the RIU 40 and transmits information about its status to the RIU 40 via the RF FSK modems 50a and 40b.

Figure 3:
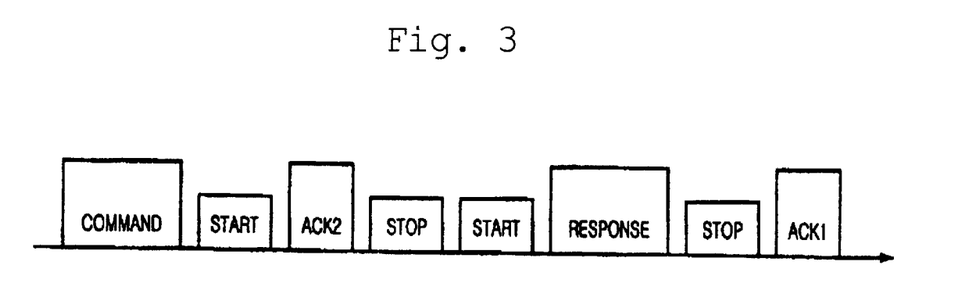
FIG. 3 is a view illustrating a messaging flow for error checking in data communication between the master base transceiver station device and the remote interfacing unit in accordance with the present invention.

FIG. 3 is a view illustrating a messaging flow for error checking in data communication between the master BTS device 30 and the RIU 40 in accordance with the present invention. In the base transceiver station of the present invention, three types of signal flows can be defined with respect to commands and responses between the master BTS device 30 and the RIU 40. Firstly, the master BTS device 30 sends a status signal request command to the RIU 40 to monitor the status of the RRU 50 and the RIU 40 sends a monitored result of the status of the RRU 50 to the master BTS device 30 in response to the status signal request command. Secondly, if the master BTS device 30 sends a command for controlling the status of the RRU 50, then the RIU 40 controls the status of the RRU 50 in response to such a command and sends the controlled result to the master BTS device 30. Thirdly, if the master BTS device 30 sends a command for monitoring an alarm of the RRU 50, then the RIU 40 monitors the alarm of the RRU 50 in response to such a command and sends the monitored result to the master BTS device 30.

The interface standard includes an acknowledge (ACK) signal and a no acknowledge (NACK) signal for prevention of an error during execution of commands among the master BTS device 30, RIU 40 and RRU 50. When the master BTS device 30 sends a command, the RIU 40 must send an ACK or NACK message to the master BTS device 30 to prevent an error on communication. The ACK message is a response message that the RIU 40 sends to the master BTS device 30 to inform that it has normally received a command from the device 30, and the NACK message is a response message that the RIU 40 sends to the master BTS device 30 to inform that it has not normally received a command from the device 30. In the present invention, a method of error correction upon receiving the NACK message is not especially limited.

Figure 4:
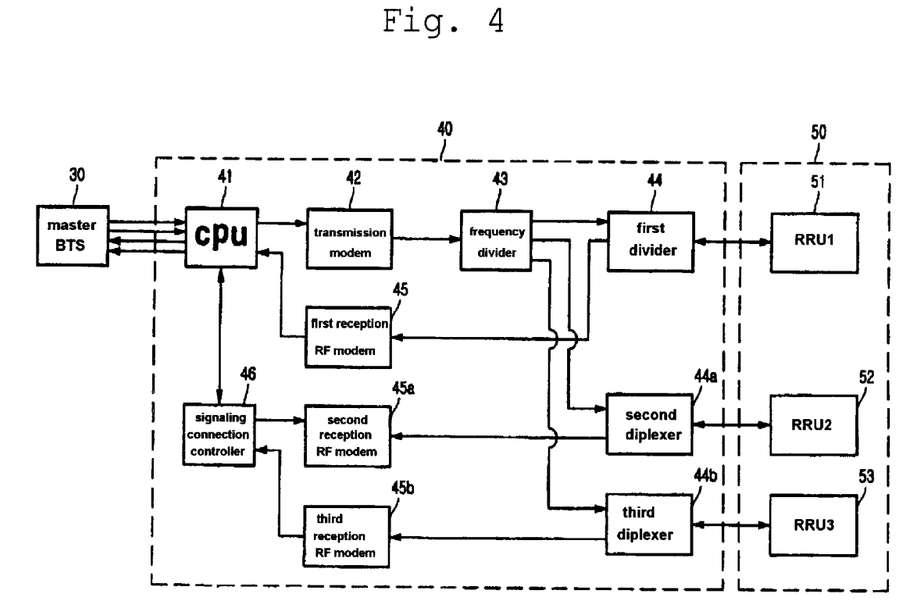
FIG. 4 is a schematic block diagram of an embodiment of the base transceiver station of the digital mobile telecommunication system in accordance with the present invention.

FIG. 4 is a schematic block diagram of an embodiment of the base transceiver station of the digital mobile telecommunication system in accordance with the present invention. As shown in this drawing, the base transceiver station of the present invention is characterized in that the RRU 50 is separated from the master BTS device 30. In the base transceiver station of the present invention, the RIU 40 is located between the RRU 50 and the master BTS device 30 to monitor and control the status of the RRU 50 and transfer status information from the RRU 50 to the master BTS device 30.

The interface between the master BTS device 30 and the RIU 40 is a control and status interface which is implemented in an asynchronous 8-bit manner based on an EIA/TIA-485-A standard (full differentiation type). A data format with one start bit, one stop bit, eight data bits and no parity bit is sent according to an interface protocol based on an EIA/TIA-232-E type. A rate of data transmission between the master BTS device 30 and the RIU 40 is 9600 bps.

A COMMAND message shown in FIG. 3 is composed of a 4-byte header and data of 0–65536 ($2^{16}$) bytes as schematically seen from the below Table 1 and as in detail seen from the below Table 2.

TABLE 1

| Header: 4 Byte | DATA: 65536 Byte |
|---|---|

TABLE 2

| Byte Number | Massage Section | Description |
|---|---|---|
| 0 | Header | Command or Response ID |
| 1 | Header | Length of Command or Response containing Header and Data |
| 2 | Header | Length of Command or Response containing Header and Data |
| 3 | Header | Header Checksum(Exclusive OR of 0,1 and 2Byte) |
| 4 | Data | First Data Byte |
| N | Data | Last Data Byte |
| N + 1 | Data | Data Checksum (Exclusive OR of 4 – N Byte) |

In the present embodiment, the master BTS device 30 and the RIU 40 communicate with each other according to the RS-232 communication protocol and the RS-422 electrical interface standard to control and monitor the status of the RRU 50. In detail, the RIU 40 connected between the master BTS device 30 and the outdoor RRU 50 is adapted to perform the following three functions. Firstly, the RIU 40 monitors and controls the status of the RRU 50. Secondly, the RIU 40 performs bi-directional communication with the master BTS device 30 or a monitoring personal computer (PC). Thirdly, the RIU 40 supplies and monitors operating power to the RRU 50. On the other hand, bi-directional communication between the RIU 40 and RRU 50 is performed in such a manner that the RIU 40 transmits a control command via the FSK modem 40b installed therein and the RRU 50 receives the control command via the FSK modem 50a installed therein and transmits its status value to the RIU 40 via the FSK modems 50a and 40b.

Now, a description will be given of formats of data messages being transmitted and received between the master BTS device 30 and the RIU 40.

First, an ACK1 message that is sent from the master BTS device 30 to the RIU 40 upon receiving a command from the RIU 40 and an ACK2 message that is sent from the RIU 40 to the master BTS device 30 upon receiving a command from the device 30 have data codes as seen from the below Tables 3 and 4, respectively.

TABLE 3

| BYTE | NAME | VALUE | Description |
|---|---|---|---|
| 0 | COMMAND ID | 60h | 96 Decimal |
| 1 | COMMAND Length | 04h | 4 BYTE |
| 2 | COMMAND Length | 00h | |
| 3 | Header Checksum | 64h | 0-2BYTE X-OR |

TABLE 4

| BYTE | NAME | VALUE | Description |
|---|---|---|---|
| 0 | COMMAND ID | 66h | 97 Decimal |
| 1 | COMMAND Length | 04h | 4BYTE |
| 2 | COMMAND Length | 00h | |
| 3 | Header Checksum | 65h | 0-2BYTE X-OR |

TABLE 5

| BYTE | NAME | VALUE | Description |
|---|---|---|---|
| 0 | COMMAND ID | 62h | 98 Decimal |
| 1 | COMMAND Length | 04h | 4 BYTE |
| 2 | COMMAND Length | 00h | |
| 3 | Header Checksum | 66h | 0-2BYTE X-OR |

TABLE 6

| BYTE | NAME | VALUE | Description |
|---|---|---|---|
| 0 | COMMAND ID | 63h | 99 Decimal |
| 1 | COMMAND Length | 04h | 4BYTE |
| 2 | COMMAND Length | 00h | |
| 3 | Header Checksum | 67h | 0-2BYTE X-OR |

In the case where data received from the RIU 40 (or the master BTS device 30) is not equal to a promised format or is subjected to the occurrence of an error resulting from other line faults, the master BTS device 30 (or the RIU 40) sends a NACK signal to the RIU 40 (or the master BTS device 30) to request it to resend data.

A START string and a STOP string have flags as seen from the below Tables 7 and 8, respectively.

TABLE 7

| BYTE | NAME | VALUE | Description |
|---|---|---|---|
| 0 | COMMAND ID | 12h | HEXA Code |
| 1 | COMMAND Length | 34h | HEXA Code |
| 2 | COMMAND Length | 56h | HEXA Code |
| 3 | Header Checksum | 78h | HEXA Code |

TABLE 8

| BYTE | NAME | VALUE | Description |
|---|---|---|---|
| 0 | COMMAND ID | 87h | HEXA |
| 1 | COMMAND Length | 65h | HEXA |
| 2 | COMMAND Length | 43h | HEXA |
| 3 | Header Checksum | 21h | HEXA |

The START string (or STOP string) precedes a command or request signal to indicate the start (or stop) of data. Upon detecting the START string without the STOP string, a receiver deletes all the contents of a receiving buffer and performs a re-receiving operation.

A REQUEST STATUS/FAULT command that is sent from the master BTS device 30 to the RIU 40, or a command for instructing the RIU 40 to monitor the status of the RRU 50, has a format as in the below Table 9.

TABLE 9

| BYTE | NAME | VALUE | Description |
|---|---|---|---|
| 0 | COMMAND ID | 40h | 66 Decimal |
| 1 | COMMAND Length | 04h | 4 BYTE |
| 2 | COMMAND Length | 00h | |
| 3 | Header Checksum | 44h | 0-2BYTE X-OR |

STATUS/FAULT response data that is sent from the RIU 40 the master BTS device 30 has a format as in the below Table 10.

TABLE 10

| BYTE | NAME | VALUE | DESCRIPTION |
|---|---|---|---|
| 0 | Response ID | 40h | 64 Decimal |
| 1 | Response Length | 1Ah | 26Byte |
| 2 | Response Length | 00h | |
| 3 | Header Checksum | 5Ah | XOR of Byte Number 0 through 2 |
| 4 | INDOOR TEMP.-α | 00h-FFh | SEE RRU TMEP. TABLE |
| 5 | OUT POWER MON.-α | 00h-FFh | SEE RRU POWER TABLE |
| 6 | RRU VOL. MON.-α | 00h-FFh | SEE RRU VOL. TABLE |
| 7 | TXRF-1 ATT.-α | 00h-FFh | SEE ATT. TABLE |
| 8 | RXRF-A ATT.-β | 00h-FFh | SEE ATT. TABLE |
| 9 | RXRF-B ATT.-β | 00h-FFh | SEE ATT. TABLE |
| 10 | DEVICE STATUS-β | 00h-FFh | SEE DEVICE STATUS TABLE |
| 11 | INDOOR TEMP.-β | 00h-FFh | SEE RRU TEMP. TABLE |
| 12 | OUT POWER MON.-β | 00h-FFh | SEE RRU POWER TABLE |
| 13 | RRU VOL. MON.-β | 00h-FFh | SEE RRU VOL. TABLE |
| 14 | TXRF-1 ATT.-β | 00h-FFh | SEE ATT. TABLE |
| 15 | RXRF-A ATT.-β | 00h-FFh | SEE ATT. TABLE |
| 16 | RXRF-B ATT.-β | 00h-FFh | SEE ATT. TABLE |
| 17 | DEVICE STATUS-β | 00h-FFh | SEE DEVICE STATUS TABLE |
| 18 | INDOOR TEMP.-γ | 00h-FFh | SEE RRU TEMP. TABLE |
| 19 | OUT POWER MON.-γ | 00h-FFh | SEE RRU POWER TABLE |
| 20 | RRU VOL. MON.-γ | 00h-FFh | SEE RRU VOL. TABLE |
| 21 | TXRF-1.ATT.-γ | 00h-FFh | SEE ATT. TABLE |
| 22 | RXRF-A ATT.-γ | 00h-FFh | SEE ATT. TABLE |
| 23 | RXRF-B ATT.-γ | 00h-FFh | SEE ATT. TABLE |
| 24 | DEVICE STATUS-γ | 00h-FFh | SEE DEVICE STATUS TABLE |
| 25 | Data Checksum | 00h-FFh | XOR of Byte number 4 through 24 |

The RIU 40 sends information regarding the status of the RRU 50 such as indoor temperatures and RF output power values to the master BTS device 30 in response to a request therefrom. Namely, the RIU 40 detects indoor temperatures of the RRU 50 varying, or rising and falling, with time and creates an indoor temperature table on the basis of HEXA codes corresponding to the detected indoor temperatures. Then, the RIU 40 sends the created indoor temperature table to the master BTS device 30. Further, the RIU 40 measures output power from an HPA module in the RRU 50, creates an output power table on the basis of HEXA codes corresponding to the measured output power values and sends the created output power table to the master BTS device 30.

Also, the RIU 40 creates an RRU variable attenuation table on the basis of HEXA codes corresponding to variable attenuation values of the HPA/LNA and sends the created variable attenuation table as response data to the master BTS device 30.

Also, the RIU 40 monitors whether its supply voltage to the RRU 50 is continuously maintained, creates an RRU DC voltage monitoring table on the basis of the monitored results and sends the created DC voltage monitoring table as response data to the master BTS device 30.

Further, the RIU 40 stores data about the status of internal modules of the RRU 50 in the form of HEXA codes in an RRU status table and sends the resultant RRU status table to master BTS device 30. Such a status table is as follows:

TABLE 11

| STATUS | D7 | D6 | D5 | D4 | D3 | D2 | D1 | D0 |
|---|---|---|---|---|---|---|---|---|
| HPA 0 = Normal 1 = Abnormal | □ | □ | □ | □ | □ | □ | □ | 1/0 |
| HPA POWER 0 = On 1 = Off | □ | □ | □ | □ | □ | □ | 1/0 | □ |
| ANT.VSWR 0 = Normal 1 = Abnormal | □ | □ | □ | □ | □ | 1/0 | □ | □ |
| LNA RXRF-A 0 = Normal 1 = Abnormal | □ | □ | □ | □ | 1/0 | □ | □ | □ |
| LNA RXRF-B 0 = Normal 1 = Abnormal | □ | □ | □ | 1/0 | □ | □ | □ | □ |
| Reserved | □ | □ | □ | □ | □ | □ | □ | □ |
| Reserved | □ | □ | □ | □ | □ | □ | □ | □ |

A table of commands for controlling Tx/Rx gains and on/off operations of the HPA is as follows:

TABLE 12

| BYTE | NAME | VALUE | DESCRIPTION |
|---|---|---|---|
| 0 | Command ID | 46h | 70 Decimal |
| 1 | Command Length | 11h | 17 Bytes |
| 2 | Command Length | 00h | |
| 3 | Header Checksum | 57h | XOR of Byte Number 0 through 2 |
| 4 | TXRF-1 ATT.-α | 00h-FFh | SEE ATTENUATION TABLE |
| 5 | RXRF-A ATT.-α | 00h-FFh | SEE ATTENUATION TABLE |
| 6 | RXRF-B ATT.-α | 00h-FFh | SEE ATTENUATION TABLE |
| 7 | DEVICE SETTING-α | 00h-FFh | SEE DEVICE SETTING TABLE |
| 8 | TXRF-1 ATT.-β | 00h-FFh | SEE ATTENUATION TABLE |
| 9 | RXRF-A ATT.-β | 00h-FFh | SEE ATTENUATION TABLE |
| 10 | RXRF-B ATT.-β | 00h-FFh | SEE ATTENUATION TABLE |
| 11 | DEVICE SETTING-β | 00h-FFh | SEE DEVICE SETTING TABLE |
| 12 | TXRF-1 ATT.-γ | 00h-FFh | SEE ATTENUATION TABLE |
| 13 | RXRF-A ATT.-γ | 00h-FFh | SEE ATTENUATION TABLE |
| 14 | RXRF-B ATT.-γ | 00h-FFh | SEE ATTENUATION TABLE |
| 15 | DEVICE SETTING-γ | 00h-FFh | SEE DEVICE SETTING TABLE |
| 16 | Data Checksum | 00h-FFh | XOR of Byte Number 4 through 15 |

Further, the RIU 40 sends a table of commands for the variable attenuation of the RRU 50, or the control of the Rx/Tx gains, in a HEXA format.

A table of HEXA codes for the control of the on/off operations of the HPA is as follows:

TABLE 13

| STATUS | D7 | D6 | D5 | D4 | D3 | D2 | D1 | D0 |
|---|---|---|---|---|---|---|---|---|
| HPA 0 = Normal 1 = Abnormal | □ | □ | □ | □ | □ | □ | □ | 1/0 |
| Reserved | □ | □ | □ | □ | □ | □ | □ | □ |
| Reserved | □ | □ | □ | □ | □ | □ | □ | □ |
| Reserved | □ | □ | □ | □ | □ | □ | □ | □ |
| Reserved | □ | □ | □ | □ | □ | □ | □ | □ |
| Reserved | □ | □ | □ | □ | □ | □ | □ | □ |
| Reserved | □ | □ | □ | □ | □ | □ | □ | □ | where, "x" is a don't care state and "1/0" are variable status values.

The RIU 40 sends to the BTS device 30 values about an alarm status of the RRU 50 in the form of a table as follows:

TABLE 14

| BYTE | NAME | VALUE | DESCRIPTION |
|---|---|---|---|
| 0 | Command ID | 4Eh | 78 Decimal |
| 1 | Command Length | 08h | 8 Byte |
| 2 | Command Length | 00h | |
| 3 | Header Checksum | 46h | XOR of Byte Number 0 through 2 |
| 4 | ALARM-α | 00h-FFh | SEE ALARM TABLE |
| 5 | ALARM-β | 00h-FFh | SEE ALARM TABLE |
| 6 | ALARM-γ | 00h-FFh | SEE ALARM TABLE |
| 7 | DATA CHECKSUM | 00h-FFh | XOR of Byte Number 4 through 6 |

A table of alarm message data that the RRU 50 transmits to the RIU 40 when an arbitrary module therein fails is as follows:

TABLE 15

| ALARM | D7 | D6 | D5 | D4 | D3 | D2 | D1 | D0 |
|---|---|---|---|---|---|---|---|---|
| HPA FAIL | ☐ | ☐ | ☐ | ☐ | ☐ | ☐ | ☐ | 1/0 |
| 0 = Normal 1 = ALARM | | | | | | | | |
| ANT.VSWR | ☐ | ☐ | ☐ | ☐ | ☐ | ☐ | 1/0 | ☐ |
| 0 = Normal 1 = ALARM | | | | | | | | |
| LNA RXRF-A | ☐ | ☐ | ☐ | ☐ | ☐ | 1/0 | ☐ | ☐ |
| 0 = Normal 1 = ALARM | | | | | | | | |
| LNA RXRF-B | ☐ | ☐ | ☐ | ☐ | 1/0 | ☐ | ☐ | ☐ |
| 0 = Normal 1 = ALARM | | | | | | | | |
| RRU ALARM | ☐ | ☐ | ☐ | 1/0 | ☐ | ☐ | ☐ | ☐ |
| 0 = Normal 1 = ALARM | | | | | | | | |
| Reserved | ☐ | ☐ | ☐ | ☐ | ☐ | ☐ | ☐ | ☐ |
| Reserved | ☐ | ☐ | ☐ | ☐ | ☐ | ☐ | ☐ | ☐ |

The above-mentioned data formats are interfaced between the master BTS device 30 and the RIU 40 and the same data formats can be interfaced between the RIU 40 and the RRU 50, with the exception that the physical communication therebetween is performed via the RF FSK modems 40b and 50a.

Next, a detailed description will be given of the construction and operation of the base transceiver station of the digital mobile telecommunication system in accordance with the preferred embodiment of the present invention with reference to FIG. 4.

With reference to FIG. 4, the base transceiver station comprises the master BTS device 30, the RIU 40 and three-sector RRUs 51, 52 and 53. The RIU 50 includes a central processing unit (CPU) 41, a signaling connection controller 46, a transmission modem 42, reception modems 45, 45a and 45b, a frequency divider 43 and three-sector diplexers 44, 44a and 44b.

The CPU 41 must communicate with the transmission modem 42 and reception modems 45, 45a and 45b under the condition that its communication ports are insufficient in number. For this reason, the signaling connection controller 46 is additionally provided to process data. Noticeably, a data processing system used herein is based on data formats of the transmission modem 42 and reception modems 45, 45a and 45b. Further, the CPU 41 communicates Tx(+)(−) and Rx(+)(−) RS 422 signals with the master BTS device 30.

The transmission modem 42 is an FSK modem for FSK-modulating output data from the CPU 41 and transferring the modulated data to the frequency divider 43. The frequency divider 43 divides the frequency of output data from the transmission modem 42 into different frequencies, or α, β and γ, and outputs the resultant data respectively to the first to third diplexers 44, 44a and 44b. Even though the three RRUs 51–53 receive the output data from the transmission modem 42 at the same time, they can be controlled in a single modem manner because they are assigned with their respective identifiers (IDs).

The first to third diplexers 44, 44a and 44b are a kind of filters and adapted for separating frequencies of the transmission modem 42 and reception modems 45, 45a and 45b from each other.

The first to third reception modems 45, 45a and 45b receive output data from the first to third diplexers 44, 44a and 44b, FSk-demodulate the received data and transfer data of the α sector to the CPU 41 and data of the β and γ sectors to the signaling connection controller 46, respectively. Noticeably, the first to third reception modems 45, 45a and 45b must have different Rx frequencies to receive and process data transmitted from the RRU 50. For example, 150 MHz is used in the α sector, 153 MHz in the β sector and 156 MHz in the γ sector, respectively.

Further, the RIU 40 and RRU 50 are interfaced via a coaxial cable.

The base transceiver station with the above-mentioned construction is operated in the following manner. First, if the master BTS device 30 sends control data for monitoring and controlling the status of the RRU 50, then the CPU 41 in the RIU 40 receives the control data and transfers it to the transmission modem 42, which subsequently FSK-modulates the control data and transmits the modulated data to the frequency divider 43.

The frequency divider 43 divides the frequency of output data from the transmission modem 42 into the frequencies of the α, β and γ sectors and outputs the resultant data respectively to the first to third diplexers 44, 44a and 44b. The first to third diplexers 44, 44a and 44b match the frequencies of the control data from the frequency divider 43 respectively with reception frequencies of the RRUs 51, 52 and 53 and then transmit the control data to the RRUs 51–53, respectively. As a result, the status of the RRUs 51–53 is monitored and controlled according to the control data.

Further, data, or monitored and controlled status results, transmitted from the RRUs 51–53 are received by the first to third diplexers 44, 44a and 44b, which then match their frequencies with reception frequencies of the reception modems 45, 45a and 45b and transfer data values of the different sectors to the reception modems 45, 45a and 45b, respectively.

As a result, the reception modems 45, 45a and 45b FSK-demodulate the received data and send the demodulated data to the master BTS device 30 through the signaling connection controller 46 and CPU 41, respectively.

As apparent from the above description, the present invention provides a base transceiver station of a digital mobile telecommunication system wherein a radio frequency unit is separated from the base transceiver station and installed remotely therefrom and a remote interfacing unit is installed between the base transceiver station and the radio frequency unit to remotely control and monitor the status of the radio frequency unit. Therefore, the base transceiver station can become so much smaller in size and lighter in weight that it can be installed with no limitation in regard to the place. As a result, the base transceiver station can be readily installed in a place effecting the optimum propagation, thereby improving the quality of speech.

Furthermore, the remote interfacing unit can remotely control and monitor the status of a plurality of radio frequency units at the same time via a radio frequency cable without using a separate control cable, thereby making the construction of the base transceiver station simple.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A base transceiver station of a digital mobile telecommunication system comprising a master base transceiver station device (master BTS device) and a plurality of remote radio frequency units separated from said master BTS device and installed at a remote site therefrom for processing radio frequency signals, wherein said base transceiver station further comprises remote interfacing means installed between said master BTS device and said remote radio frequency units for:

a) transmitting control commands to said remote radio frequency units in response to control data from said master BTS device to monitor and control the status of said radio frequency units;

b) supplying and monitoring operating power to said remote radio frequency units; and     c) receiving status values from said remote radio frequency units and interfacing them to said master BTS device; said remote interfacing means including:

a central processing unit;

a transmission modem for modulating said control data from said master BTS device in a frequency shift keying manner and transmitting the modulated control data to said radio frequency units;

a frequency divider for dividing the frequency of output data from said transmission modem into different frequencies;

a plurality of diplexers, each of said diplexers transmitting a corresponding one of output signals from said frequency-divider to one of said radio frequency units associated with a given sector at a transmission frequency and receiving said status value from said corresponding radio frequency unit at a reception frequency;

a plurality of reception modems for demodulating output data from said diplexers in said frequency shift keying manner, respectively; and         a signaling connection controller for receiving output data from said reception modems and sending the received data to said master BTS device.

2. The base transceiver station as set forth in claim 1, wherein said master BTS device and said remote interfacing means perform communication with each other according to an RS-232 communication protocol and an RS-422 electrical interface standard.

3. The base transceiver station as set forth in claim 1, wherein said remote interfacing means transmits said control commands to said remote radio frequency units and receives said status values therefrom via radio frequency modems.

4. The base transceiver station as set forth in claim 1, wherein said remote interfacing means and said remote radio frequency units are interconnected via a coaxial cable.

5. The base transceiver station as set forth in claim 1, wherein said diplexers have different reception frequencies.

6. The base transceiver station as set forth in claim 1, wherein said transmission frequency is 160 MHz and said reception frequency is 150 MHz.

\* \* \* \* \*